(12) United States Patent
Lee et al.

(10) Patent No.: US 12,626,973 B2
(45) Date of Patent: May 12, 2026

(54) INTEGRATED COOLING MODULE HAVING RESERVOIR TANK

(71) Applicant: COAVIS, Sejong-si (KR)

(72) Inventors: Hyuntae Lee, Sejong-si (KR);
Wookeun Lee, Sejong-si (KR)

(73) Assignee: COAVIS, Sejong-si (KR)

( * ) Notice: Subject to any disclaimer, the term of this patent is extended or adjusted under 35 U.S.C. 154(b) by 335 days.

(21) Appl. No.: 18/481,161

(22) Filed: Oct. 4, 2023

(65) Prior Publication Data

US 2024/0120577 A1     Apr. 11, 2024

(30) Foreign Application Priority Data

Oct. 5, 2022    (KR) ........................ 10-2022-0127206

(51) Int. Cl.
*H01M 10/6568* (2014.01)
*B60K 11/02* (2006.01)
*H01M 10/613* (2014.01)
*H01M 10/625* (2014.01)

(52) U.S. Cl.
CPC ..... *H01M 10/6568* (2015.04); *H01M 10/613* (2015.04); *H01M 10/625* (2015.04); *B60K 11/02* (2013.01); *H01M 2220/20* (2013.01)

(58) Field of Classification Search
CPC ........... H01M 10/6568; H01M 10/613; H01M 10/625

USPC .................................................... 165/104.33
See application file for complete search history.

(56) References Cited

U.S. PATENT DOCUMENTS

| | | | |
|---|---|---|---|
| 6,311,514 B1* | 11/2001 | Chisnell | F25B 43/006 62/503 |
| 2019/0170053 A1* | 6/2019 | Mark | F01P 11/029 |
| 2020/0386145 A1 | 12/2020 | Jeong | |
| 2021/0218088 A1* | 7/2021 | Kim | H01M 10/6568 |
| 2021/0219466 A1* | 7/2021 | Kim | H05K 7/20263 |
| 2022/0099017 A1 | 3/2022 | Sakata | |
| 2022/0140420 A1* | 5/2022 | Kim | H01M 10/667 62/190 |

FOREIGN PATENT DOCUMENTS

| | | |
|---|---|---|
| JP | S63200624 U | 12/1988 |
| KR | 0115600 Y | 4/1998 |
| KR | 200209382 Y | 1/2001 |
| KR | 20200113731 A | 10/2020 |
| KR | 20210139097 A | 11/2021 |
| KR | 20220042715 A | 4/2022 |

* cited by examiner

*Primary Examiner* — Steve S Tanenbaum
(74) *Attorney, Agent, or Firm* — McCoy Russell LLP

(57) ABSTRACT

Provided is a cooling module in which a reservoir tank, a cooling fluid pump, and a direction change valve for pumping and circulating a cooling fluid are integrally modularized in a vehicle's cooling system, and more particularly, relates to a reservoir tank for a cooling module that stabilizes an unstable fluid introduced into a reservoir tank and transmits the fluid to a pump, thereby minimizing damage to the pump, and a cooling module including the same.

9 Claims, 3 Drawing Sheets

INTEGRATED COOLING MODULE HAVING RESERVOIR TANK

CROSS-REFERENCE TO RELATED APPLICATIONS

This application claims priority under 35 U.S.C. § 119 to Korean Patent Application No. 10-2022-0127206, filed on Oct. 5, 2022, in the Korean Intellectual Property Office, the disclosure of which is incorporated herein by reference in its entirety.

TECHNICAL FIELD

The following disclosure relates to a cooling module in which a reservoir tank, a cooling fluid pump, and a direction change valve for pumping and circulating a cooling fluid are integrally modularized in a vehicle's cooling system, and more particularly, relates to a reservoir tank for a cooling module that stabilizes an unstable fluid introduced into a reservoir tank and transmits the fluid to a pump, thereby minimizing damage to the pump, and a cooling module including the same.

BACKGROUND

Electric vehicles drive using motors powered by batteries or fuel cells, so they emit less carbon and produce less noise. In addition, electric vehicles are environmentally friendly because they use motors that are more energy efficient than conventional engines.

These electric vehicles are equipped with a thermal management system for cooling and heating for indoor air conditioning and cooling electrical components, such as drive motors, batteries, and inverters.

However, the thermal management system includes a cooling fluid system for heating the vehicle's interior and cooling and heating electrical components. The cooling fluid system has a large number of components for circulation of a cooling fluid and a large number of pipes connecting them, so the process to assemble the cooling fluid system is complex and difficult. In addition, as the length of the pipes connecting the components may increase, the loss of system efficiency due to the pressure drop of the flowing cooling fluid may increase.

FIG. 1 shows a perspective view of a conventional cooling fluid module for a vehicle. As shown, the conventional cooling fluid module for a vehicle is provided with a first circulation pump 31 and a second circulation pump 32, which are a plurality of cooling fluid pumps, a cooling fluid is circulated in a cooling line by way of a battery using the first circulation pump 31, and the cooling fluid is circulated in a cooling line by way of electrical components using the second circulation pump. In addition to the first circulation pump 31 and the second circulation pump 32, a reservoir tank 10 for removing bubbles in the cooling fluid and supplementing the cooling fluid and a valve 20 for controlling cooling fluid connection of a plurality of flow paths between the components are configured as an integral module, thereby simplifying the cooling fluid system.

Centrifugal pumps are generally used as cooling fluid pumps for pumping cooling fluid, such as the first circulation pump 31 and the second circulation pump 32. Conventionally, in order to satisfy the performance, efficiency of the cooling fluid pump and the size and noise of the cooling fluid pump, multiple cooling fluid pumps are used. Since these centrifugal pumps react sensitively depending on a state of the fluid flowing in, that is, if unstable fluid flows in, damage to the pump may occur, and thus, it is necessary to stabilize the fluid flowing into the pump.

Meanwhile, the cooling module has a cycle in which cooling fluid that has passed through the battery or electrical components is collected in a reservoir tank through a pump, and the cooling fluid stored in the reservoir tank flows back into the pump and is supplied to the battery or electrical components. At this time, the fluid flowing into the reservoir tank may be an unstable fluid including many bubbles and having a low pressure. If the fluid in the above unstable state is supplied directly to the pump, flow defects in the pump may occur, and if it continues, the pump may be damaged due to the fluid in the unstable state.

Therefore, there is a need to develop technology to prevent damage to the pump due to unstable fluid flowing into the pump.

SUMMARY

An exemplary embodiment of the present invention is directed to providing a reservoir tank for a cooling module that removes bubbles in unstable fluid flowing into the reservoir tank and minimizes negative pressure to supply stable fluid through a pump, and a cooling module including the same.

An exemplary embodiment of the present invention is directed to providing a reservoir tank for a cooling module that guides cooling fluid flowing into the reservoir tank to a region farthest from an inlet of the pump through a dome screen and stabilizes the cooling fluid while moving to the pump inlet, and a cooling module including the same.

An exemplary embodiment of the present invention is directed to providing a reservoir tank for a cooling module capable of stabilizing fluid flowing into the pump by allowing the cooling fluid flowing into the reservoir tank to pass through at least one porous member to remove bubbles or foreign substances, and a cooling module including the same.

In one general aspect, in a cooling module including a reservoir tank in which cooling fluid is stored and a pump coupled to the reservoir tank and having a pump inlet in communication with the reservoir tank to pump the cooling fluid, the cooling module includes a guide dome formed on a side opposite to a side into which the cooling fluid flows in so that the cooling fluid flowing into the reservoir tank is transferred to a region spaced apart from the pump inlet.

The cooling module may include an tank inlet that transfers the cooling fluid supplied to the reservoir tank into the reservoir tank, and the guide dome may be provided to be adjacent to the tank inlet so that the cooling fluid flowing in along the tank inlet is guided along an inner surface and transferred to the region spaced apart from the pump inlet.

The outlet may allow the cooling fluid to flow out upwardly, and the guide dome may be formed in the form of a guide dome that is concave upwardly, receive the cooling fluid flowing upwardly, transport the cooling fluid along the inner surface, and then discharge the cooling fluid downwardly in a circumferential direction.

The guide dome may be formed on a dome screen coupled to an upper interior of the reservoir tank.

The reservoir tank may include a first space in which the guide dome is disposed; a second space in which the pump inlet is disposed; and a first partition dividing the first space and the second space, wherein a first porous member may be provided on the first partition to filter bubbles and foreign substances of the cooling fluid stored in the first space and supply the filtered bubbles and foreign substances to the second space.

The first porous member may be formed in a certain region of the first partition, and may be formed close to a circumference of the first partition spaced apart from the pump inlet at a maximum distance.

The second space may include: a third space communicating with the first space through the first porous member; a fourth space in which the pump inlet is disposed; and a second partition dividing the third space and the fourth space, wherein a second porous member is provided on the second partition to filter bubbles and foreign substances of the cooling fluid stored in the third space and supply the cooling fluid to the fourth space.

The first partition may be formed in a horizontal direction, so that the first space is formed on an upper side and a second space is formed on a lower side, and the second partition may be formed in a vertical direction, so that the third space is formed on one side and the fourth space is formed on the other side.

The reservoir tank may include a first space in which a first cooling fluid is stored and a second space in which a second cooling fluid is stored, and the guide dome may be provided in each of the first space and the second space.

The first cooling fluid may be stored in the reservoir tank via a battery for cooling the battery, and the second cooling fluid may be stored in the reservoir tank via an electrical component for cooling the electrical component.

Other features and aspects will be apparent from the following detailed description, the drawings, and the claims.

DETAILED DESCRIPTION OF EXEMPLARY EMBODIMENTS

Hereinafter, an exemplary embodiment of the present invention described above will be described in detail with reference to the drawings.

Figure 1:
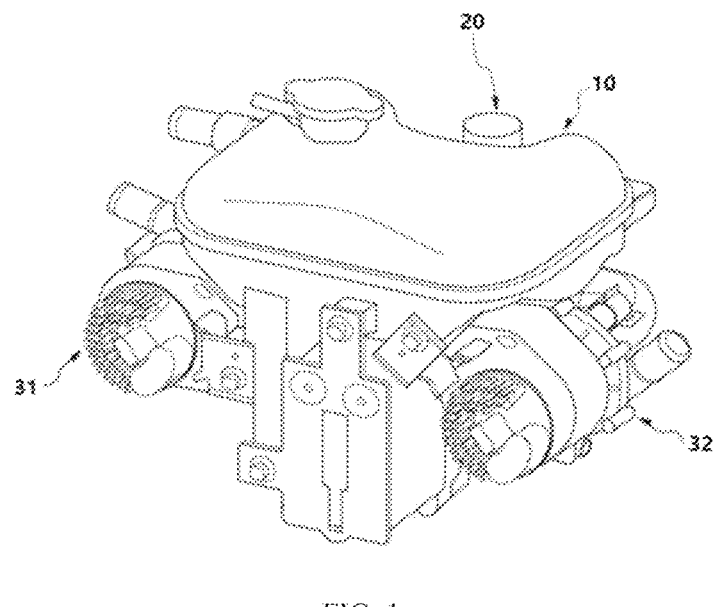
FIG. 1 is a perspective view illustrating a conventional cooling module.
Figure 2:
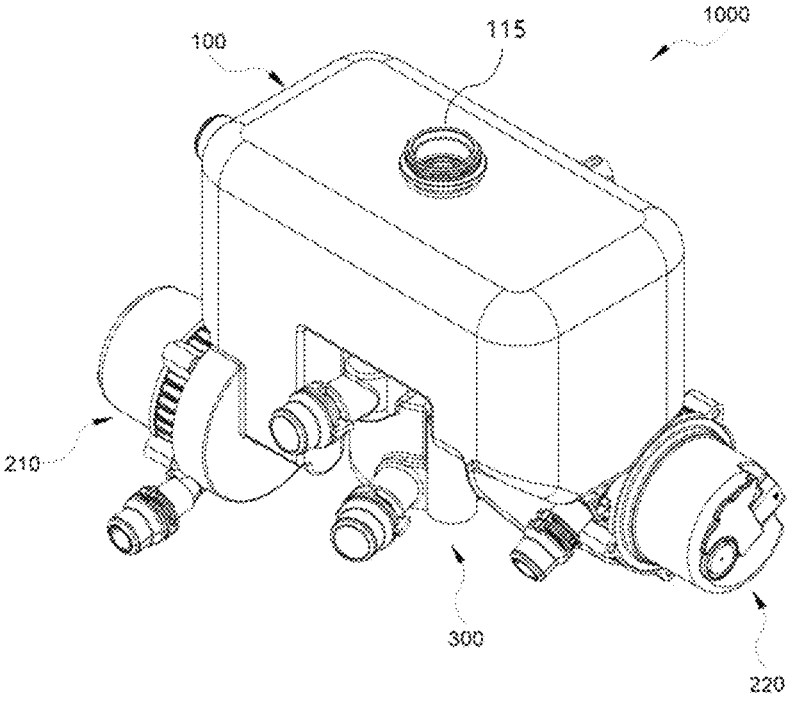
FIG. 2 is a perspective view of a cooling module including a reservoir tank according to an exemplary embodiment of the present invention.
Figure 3:
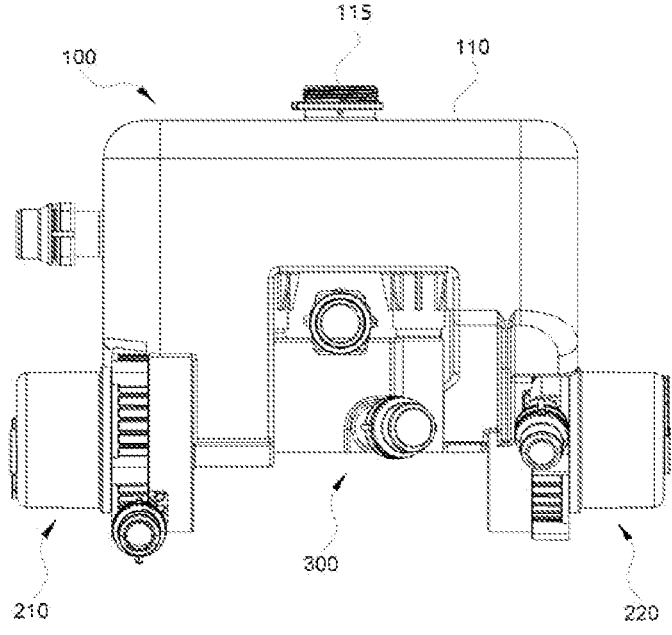
FIG. 3 is a front view of a cooling module including a reservoir tank according to an exemplary embodiment of the present invention.

FIG. 2 shows an overall perspective view of a cooling module 1000 including a reservoir tank 100 according to an exemplary embodiment of the present invention, and FIG. 3 shows a front view of the cooling module 1000 including the reservoir tank 100 according to an exemplary embodiment of the present invention. As shown, the cooling module 1000 may include the reservoir tank 100, a pair of pumps 210 and 220, and a direction change valve 300. Although not shown in the drawing, a controller (not shown) may further be included.

The reservoir tank 100 stores cooling fluid via a battery and cooling fluid via an electrical component, and the cooling fluid via the battery is supplied to the first pump 210, and the cooling fluid via the electrical component is supplied to the second pump 220. The reservoir tank 100 may have an empty space formed therein so that cooling fluid may be stored, and a pressure cap coupler 115 may be formed on an upper surface of the reservoir tank 100, so that internal pressure of the reservoir tank 100 may be adjusted by a pressure cap (not shown). In addition, a first space A10 and a second space A20 may be divided through a partition 105 (see FIG. 6) so that the first space A10 (see FIG. 4) where cooling fluid via the battery is stored and the second space A20 (see FIG. 4) where cooling fluid via an electrical component may be separately formed.

The pumps 210 and 220 are cooling fluid pumps that may receive cooling fluid from the reservoir tank 100 and pump the cooling fluid to a necessary place. The pumps 210 and 220 may include a first pump 210 for cooling the battery by circulating the cooling fluid stored in the first space to the battery and a second pump 220 for cooling the electrical component by circulating the cooling fluid stored in the second space to the electrical component. Each pump 210 and 220 may be disposed and coupled to a bottom of one side and the bottom of the other side of the reservoir tank 100, and the pump 210 may have a pump inlet 211 (see FIG. 4) connected to the reservoir tank 100 so that the cooling fluid inside the reservoir tank 100 may smoothly flow into the pump 210.

The direction change valve 300 is a valve that may change the direction of the cooling fluid flow according to an operation thereof. The direction change valve 300 is coupled to a lower side of the reservoir tank 100 and has a plurality of inlet ports and outlet ports to allow the cooling fluid circulating the battery to flow into the reservoir tank 100 or block the cooling fluid circulating the battery from flowing into the reservoir tank 100, or to allow the cooling fluid circulating the electrical component to flow into the reservoir tank 100 or block the cooling fluid circulating the electrical components from flowing into the reservoir tank 100.

The controller may be connected to each of the pumps 210 and 220 and the direction change valve 300 by a cable and may control the operation of the pumps 210 and 220 and the direction change valve 300. The controller may be disposed on the side of the reservoir tank 100 other than the side where the pumps 210 and 220 and the direction change valve 300 are disposed, and coupled to the reservoir tank 100.

The cooling module 1000 according to an exemplary embodiment of the present invention having the above configuration ensures that the unstable cooling fluid flowing into the reservoir tank 100 is supplied to the pump inlet 211 of the pump 210 in a stabilized state. Hereinafter, a detailed configuration of the cooling module 1000 having the above purpose will be described in detail with reference to the drawings.

Figure 4:
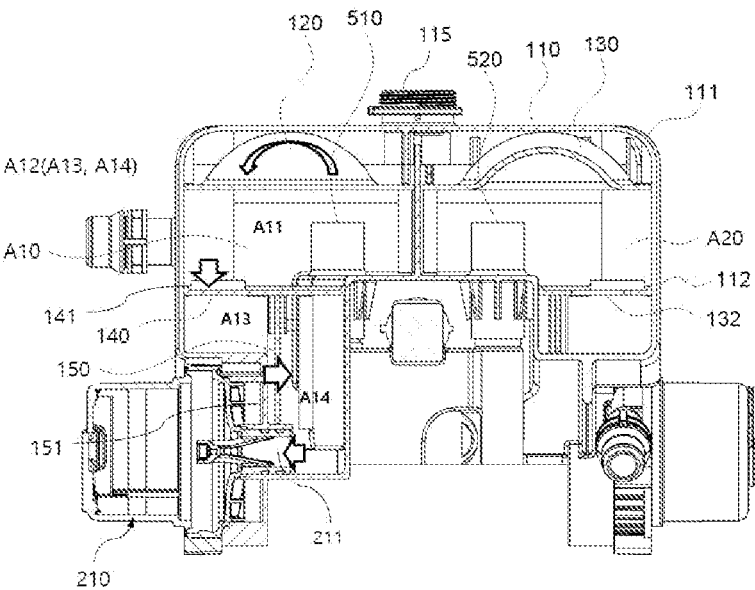
FIG. 4 is a cross-sectional view of a cooling module including a reservoir tank according to an exemplary embodiment of the present invention.
Figure 5:
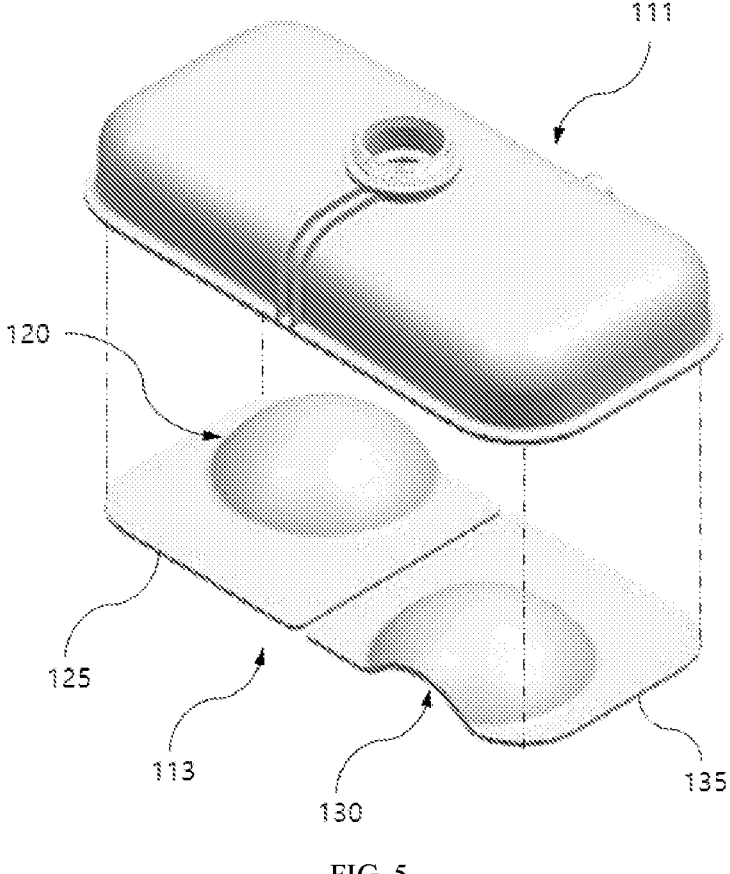
FIG. 5 is an exploded perspective view of a flange and a dome screen of a reservoir tank according to an exemplary embodiment of the present invention.
Figure 6:
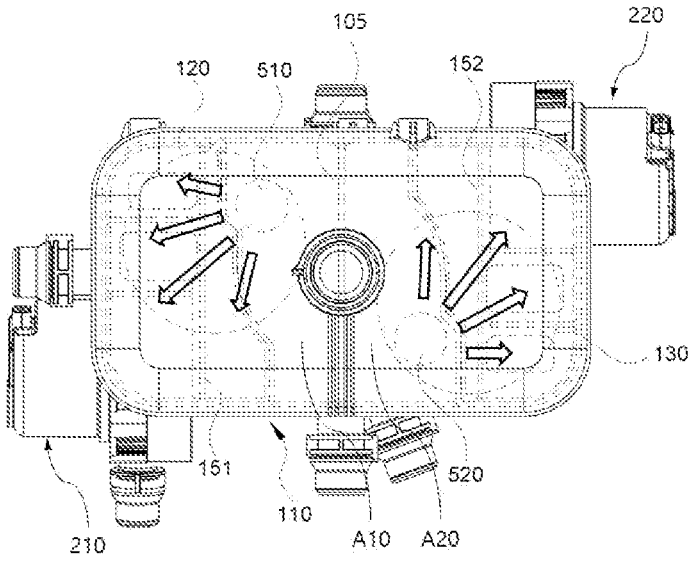
FIG. 6 is a plan projective view of a reservoir tank according to an exemplary embodiment of the present invention.

FIG. 4 shows a cross-sectional view of the cooling module 1000 including the reservoir tank 100 according to an exemplary embodiment of the present invention, FIG. 5 shows an exploded perspective view of a flange 111 and a dome screen 113 of the reservoir tank 100 according to an exemplary embodiment of the present invention, and FIG. 6 shows a plan projective view of the reservoir tank 100 according to an exemplary embodiment of the present invention.

As shown, the reservoir tank 100 includes a tank body 110 in which cooling fluid is stored. In addition, the tank body 110 is configured as a single body, and the tank body 110 includes a housing 112 in which the cooling fluid is stored and the flange 111 provided above the housing 112 and having a pressure cap coupler 115. At this time, the reservoir tank 100 includes transfer units 120, 130, 510, and 520 that guide the transfer of the cooling fluid within the reservoir tank 100 so that the cooling fluid flowing into the reservoir tank 100 is transferred to a region spaced apart from the pump inlet 211.

The transfer units 120, 130, 510, and 520 include a first tank inlet 510 provided to supply the cooling fluid via the battery to the first space A10 and a second tank inlet where the cooling fluid via the electrical components is supplied to the second space A20. The tank inlets 510 and 520 are configured to discharge cooling fluid to the upper side of the reservoir tank 100. In addition, the transfer units 120, 130, 510, and 520 include guide domes 120 and 130 which are provided on the flange 111 and concave upwardly. The guide domes 120 and 130 are configured to receive the cooling fluid flowing out of the tank inlets 510 and 520 by an inner surface of one side of the guide domes 120 and 130 in a circumferential direction and discharge the cooling fluid downwardly along the circumference of the other side except for the one side. That is, the cooling fluid flowing out of the tank inlet 510 is not directly supplied to the pump inlet 211 of the pump 210 in an unstable state, but the cooling fluid is distributed and transferred to a region farthest from the pump inlet 211, so that a transfer path of the pump inlet 211 of the cooling fluid supplied to the reservoir tank 100 may be maintained as long as possible. When the transfer path of the cooling fluid becomes longer, bubbles are efficiently removed during the transfer process, making it possible to supply the cooling fluid in a stabilized state to the pump 210. In addition, as the cooling fluid flowing out of the tank inlets 510 and 520 is transferred along the inner surface of the guide dome 120 and 130 at a gentle slope, there is an advantage of reducing noise caused by impact with the inner surface when the cooling fluid flows out. In addition, it is also possible to transfer the cooling fluid to a desired location by adjusting the diameter of the guide domes 120 and 130.

Referring to FIG. 5, the guide domes 120 and 130 may be formed on the dome screen 113 coupled to the flange 111 provided on the upper side of the tank body 110 and disposed on the upper side of the tank body 110. The dome screen 113 may include a first dome screen 125 provided on the first space A10 and a second dome screen 135 provided on the second space A20, and the first guide dome 120 may be formed to be convex upwardly from the first dome screen 125 on a flat plate, and the second guide dome 130 may be formed to be convex upwardly from the second dome screen 135 on a flat plate. At this time, it is preferable that the level of the cooling fluid stored in the reservoir tank 100 is maintained at a level where the lower end portions of the guide domes 120 and 130 are submerged. This is to prevent noise or bubbles that may occur when the cooling fluid flows into the reservoir tank due to the formation of an air layer between the dome screen 113 and the cooling fluid.

Meanwhile, the first space A10 may be divided into a first space A11 where the end portion of the first tank inlet 510 is located and a second space A12 where the pump inlet 211 is disposed, and the first partition 140 may be disposed between the first space A11 and the second space A12 to separate the first space A11 and the second space A12. At this time, a first porous member 141 may be provided on the first partition 140. The first porous member 141 is configured to filter bubbles or foreign substances contained in the cooling fluid and may be formed in a plate shape with a plurality of through-holes having a smaller diameter than the bubbles or foreign substances. For example, the first porous member 141 may be, for example, a porous filter, a screen filter, a mesh, etc. In addition, the through-hole may have any shape, such as circle, oval, or square, as long as it is a shape for removing bubbles or foreign substances.

Therefore, the cooling fluid transferred to the first space A11 through the first tank inlet 510 and the first guide dome 120 may be filtered as a stable fluid from bubbles and foreign substances or unstable fluid through the first porous member 141, and transferred to the second space A12 to be supplied to the pump 210. The first partition 140 may be disposed in the horizontal direction on the first space A1 so that the first space A11 is formed on the upper side and the second space A12 is formed on the lower side. The first porous member 141 may be formed in a certain region of the first partition 140, but may be formed close to the periphery of the first partition 140 at the maximum distance from the pump inlet 211. Through this, the flow path of the cooling fluid may be formed as long as possible.

In addition, the second space A12 may be divided into a third space A13 spaced apart from the pump inlet 211 and a fourth space A14 in which the pump inlet 211 is disposed, and also, a second partition 150 may be disposed between the third space A13 and the fourth space A14 to partition the first space A11 and the second space A12. At this time, the second porous member 151 may be disposed on the second partition 150. The second porous member 151 is configured to filter bubbles or foreign substances contained in the cooling fluid and may be formed in a plate shape with a plurality of through-holes having a smaller diameter than the bubbles or foreign substances. For example, the second porous member 151 may be a porous filter, screen filter, mesh, etc. In addition, the through-hole may have any shape, such as circle, oval, or square, as long as it is a shape for removing bubbles or foreign substances.

In addition, the cooling fluid in the first space A11 may be configured to communicate only with the third space A13 through the first porous member 141. Therefore, bubbles and foreign substances of the cooling fluid supplied from the first space A11 to the third space A13 may be additionally filtered through the second porous member 151 and the cooling fluid is transferred to the fourth space A14 and supplied to the pump 210 in a stable state. The second porous member 151 is disposed in a vertical direction on the second space A12, forming the third space A13 on one side and the fourth space A14 on the other side.

The first space A10 and the second space A20 differ from each other only in the stored cooling fluid, and since their structures may be formed symmetrically, a detailed description of the second space A20 will be omitted.

As shown, the cooling fluid supplied to the reservoir tank 100 through the tank inlet 510 flows out to one side in the circumferential direction of the guide dome 120, moves along the inner surface of the guide dome 120, is guided to the farthest region from the pump inlet 211, and is transferred to the pump inlet 211 along the longest path, so that stabilized fluid is supplied to the pump 210 during the transfer process.

In addition, the cooling fluid supplied to the first space A10 of the reservoir tank 100 is configured to pass through at least one porous member 151, so that the cooling fluid without bubbles and foreign substances is supplied to the first pump 210, and the cooling fluid supplied to the second space A20 of the reservoir tank 100 is also configured to pass through at least one porous member 152, so that the cooling fluid without bubbles and foreign substrates may be supplied to the second pump 220.

The reservoir tank for the cooling module of the present invention with the above configuration and the cooling module including the same have the effect of preventing damage to the pump due to the supply of unstable fluid by stabilizing the unstable fluid flowing into the reservoir tank and supplying it to the pump.

The present invention should not be construed as being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

DETAILED DESCRIPTION OF MAIN ELEMENTS

1000: Cooling module
100: reservoir tank
105: partition
110: tank body
111: flange
112: housing
113: dome screen
115: pressure cap coupler
120, 130: guide dome
125: first dome screen
135: second dome screen
140: first partition
141: first porous member
150: second partition
151: second porous member
210, 220: pump
211: pump inlet
300: direction change valve
510: first outlet
520: second outlet
A10: first space
A11: first space
A12: second space
A13: third space
A14: fourth space
A20: second space

What is claimed is:

1. A cooling module including a reservoir tank in which cooling fluid is stored and a pump coupled to the reservoir tank, wherein the pump has a pump inlet in communication with the reservoir tank to pump the cooling fluid, wherein the cooling module includes a tank inlet in communication with the reservoir tank such that the cooling fluid flows into the reservoir tank, and a guide dome formed on a side opposite to a side into which the cooling fluid flows in so that the cooling fluid flowing into the reservoir tank is transferred to a region spaced apart from the pump inlet, wherein the reservoir tank includes:

a first space in which the guide dome is disposed;

a second space in which the pump inlet is disposed; and a first partition dividing the first space and the second space, and wherein a first porous member is provided on the first partition to filter bubbles and foreign substances of the cooling fluid stored in the first space and supply the filtered bubbles and foreign substances to the second space.

2. The cooling module of claim 1, wherein the guide dome is provided to be adjacent to the tank inlet so that the cooling fluid flowing in along the tank inlet is guided along an inner surface and transferred to the region spaced apart from the pump inlet.

3. The cooling module of claim 2, wherein the tank inlet allows the cooling fluid to flow out upwardly, and the guide dome is formed in the form of a guide dome that is concave upwardly, receives the cooling fluid flowing upwardly, transports the cooling fluid along the inner surface, and then discharges the cooling fluid downwardly in a circumferential direction.

4. The cooling module of claim 2, wherein the guide dome is formed on a dome screen coupled to an upper interior of the reservoir tank.

5. The cooling module of claim 1, wherein the first porous member is formed in a certain region of the first partition, and is formed close to a circumference of the first partition spaced apart from the pump inlet at a maximum distance.

6. The cooling module of claim 5, wherein the second space includes:

a third space communicating with the first space through the first porous member;

a fourth space in which the pump inlet is disposed; and a second partition dividing the third space and the fourth space, wherein a second porous member is provided on the second partition to filter bubbles and foreign substances of the cooling fluid stored in the third space and supply the cooling fluid to the fourth space.

7. The cooling module of claim 6, wherein the first partition is formed in a horizontal direction, so that the first space is formed on an upper side and a second space is formed on a lower side, and the second partition is formed in a vertical direction, so that the third space is formed on one side and the fourth space is formed on the other side.

8. A cooling module including a reservoir tank in which cooling fluid is stored and a pump coupled to the reservoir tank, wherein the pump has a pump inlet in communication with the reservoir tank to pump the cooling fluid, wherein the cooling module includes a tank inlet in communication with the reservoir tank such that the cooling fluid flows into the reservoir tank, and a guide dome formed on a side opposite to a side into which the cooling fluid flows in so that the cooling fluid flowing into the reservoir tank is transferred to a region spaced apart from the pump inlet, wherein the reservoir tank includes a first region in which a first cooling fluid is stored and a second region in which a second cooling fluid different from the first cooling fluid is stored, and the guide dome is provided in each of the first region and the second region.

9. The cooling module of claim 8, wherein the first cooling fluid is stored in the reservoir tank via a battery for cooling the battery, and the second cooling fluid is stored in the reservoir tank via an electrical component for cooling the electrical component.

\* \* \* \* \*